United States Patent
Koh et al.

(10) Patent No.: US 10,623,677 B2
(45) Date of Patent: Apr. 14, 2020

(54) IMAGE SENSOR FOR IMPROVING NONLINEARITY OF ROW CODE REGION, AND DEVICE INCLUDING THE SAME

(71) Applicant: SAMSUNG ELECTRONICS CO., LTD., Suwon-si (KR)

(72) Inventors: Kyoung Min Koh, Hwaseong-si (KR); Jae Jin Jung, Seoul (KR); Moo Young Kim, Suwon-si (KR); Jae Cheol Yun, Seoul (KR); Seung Jin Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/518,298

(22) Filed: Jul. 22, 2019

(65) Prior Publication Data

US 2019/0349545 A1 Nov. 14, 2019

Related U.S. Application Data

(63) Continuation of application No. 14/956,685, filed on Dec. 2, 2015, now Pat. No. 10,362,253.

(30) Foreign Application Priority Data

Dec. 5, 2014 (KR) .................. 10-2014-0173996

(51) Int. Cl.
    *H04N 5/378* (2011.01)
    *H04N 5/232* (2006.01)
    *H04N 5/357* (2011.01)

(52) U.S. Cl.
    CPC ......... *H04N 5/378* (2013.01); *H04N 5/23245* (2013.01); *H04N 5/3575* (2013.01)

(58) Field of Classification Search
    CPC ... H04N 5/23245; H04N 5/3575; H04N 5/378
    See application file for complete search history.

(56) References Cited

U.S. PATENT DOCUMENTS

| 4,179,711 A | 12/1979 | Nagumo |
| 8,203,477 B2 | 6/2012 | Lee et al. |
| (Continued) | | |

FOREIGN PATENT DOCUMENTS

| CN | 102209210 A | 10/2011 |
| KR | 10-0790259 B1 | 1/2008 |
| (Continued) | | |

OTHER PUBLICATIONS

Communication dated Jul. 2, 2019 issued by the State Intellectual Property Office of P.R. China in counterpart Chinese Application No. 201510885533.7.

*Primary Examiner* — Daniel M Pasiewicz

(74) *Attorney, Agent, or Firm* — Sughrue Mion, PLLC

(57) ABSTRACT

An image sensor is provided. The image sensor includes a pixel configured to generate a reset signal and an image signal, a comparator configured to compare the reset signal with a reference signal and generate a first comparison signal, a counter configured to generate a first count value corresponding to the reset signal based on a clock signal and the first comparison signal, and a reference signal generator configured to generate the reference signal which changes between a first level corresponding to a maximum reset count value of the counter and a second level corresponding to a minimum reset count value of the counter during a reset signal period.

13 Claims, 11 Drawing Sheets

(56) References Cited

U.S. PATENT DOCUMENTS

| | | |
|---|---|---|
| 8,598,901 B2 | 12/2013 | Hiyama et al. |
| 8,686,341 B2 | 4/2014 | Noiret et al. |
| 8,711,259 B2 | 4/2014 | Maehashi et al. |
| 8,749,682 B2 | 6/2014 | Moore |
| 8,760,213 B2 | 6/2014 | Saito et al. |
| 8,760,337 B2 | 6/2014 | Yamazaki |
| 8,792,029 B2 | 7/2014 | Lee |
| 10,362,253 B2 * | 7/2019 | Koh ................ H04N 5/3575 |
| 2009/0225211 A1 | 9/2009 | Oike |
| 2011/0242381 A1 | 10/2011 | Sakakibara et al. |
| 2013/0182157 A1 | 7/2013 | Ono |
| 2014/0184865 A1 | 7/2014 | Muto et al. |
| 2015/0042859 A1 | 2/2015 | Lee et al. |

FOREIGN PATENT DOCUMENTS

| | | |
|---|---|---|
| KR | 10-1111638 B1 | 2/2012 |
| KR | 10-1356049 B1 | 1/2014 |

* cited by examiner

IMAGE SENSOR FOR IMPROVING NONLINEARITY OF ROW CODE REGION, AND DEVICE INCLUDING THE SAME

CROSS-REFERENCE TO THE RELATED APPLICATION

This is a continuation of U.S. application Ser. No. 14/956,685 filed Dec. 2, 2015, which claims priority from Korean Patent Application No. 10-2014-0173996 filed on Dec. 5, 2014, the disclosure of which is incorporated herein in its entirety by reference.

BACKGROUND

1. Field

Apparatuses and methods consistent with exemplary embodiments of the inventive concept relate to an image sensor, and more particularly, to an image sensor for improving nonlinearity of a row code region in a single-slope analog-to-digital (AD) converter, a method of operating the same, and a device including the same.

2. Description of the Related Art

A complementary metal oxide semiconductor (CMOS) image sensor is a solid-state image pickup device manufactured using CMOS processes. The CMOS image sensor has lower manufacturing costs and a smaller size than a charge coupled device (CCD) image sensor which includes a high-voltage analog circuit, and thus, has an advantage of low power consumption. In addition, as the performance of the CMOS image sensor has been improved, this solid-state image pickup device has gained more popularity that the CCD image sensor for various electronic appliances including portable devices such as a smart phone and a digital camera.

A pixel array included in the CMOS image sensor may include a photoelectric conversion element in each pixel. The photoelectric conversion element generates an electrical signal varying with a quantity of incident light. The CMOS image sensor processes electrical signals to produce image data. The CMOS image sensor generally uses a single-slope AD conversion method for AD conversion. In the single-slope AD conversion method, a ramp signal monotonously changing in one direction over time is compared with a pixel signal having a predetermined voltage level, and time (or a time point) when a voltage level of the ramp signal is equal to a voltage level of the pixel signal is converted into a digital signal.

A CMOS image sensor includes AD converters which convert analog pixel signals output from pixels into digital signals. Nonlinearity may occur in the AD converters. Nonlinearity adversely affects AD conversion.

SUMMARY

According to an exemplary embodiment of the inventive concept, there is provided an image sensor which may include: a pixel configured to generate a reset signal and an image signal, a comparator configured to compare the reset signal with a reference signal and generate a first comparison signal, a counter configured to generate a first count value corresponding to the reset signal based on a clock signal and the first comparison signal, and a reference signal generator configured to generate the reference signal which changes between a first level corresponding to a maximum reset count value of the counter and a second level corresponding to a minimum reset count value of the counter during a reset signal period. The image sensor may further include an output circuit configured to output a reset count value corresponding to a difference between the maximum reset count value and the first count value.

The reference signal generator may generate, as the reference signal, either a first reference signal ramping up from the first level to the second level or a second reference signal ramping down from the second level to the first level in response to control signals during the reset signal period.

The reference signal generator may include a first reference signal generator configured to generate the first reference signal ramping up from the first level to the second level during the reset signal period, a second reference signal generator configured to generate the second reference signal ramping down from the second level to the first level during the reset signal period, and a selection circuit configured to output either the first reference signal or the second reference signal as the reference signal in response to a selection signal.

The reference signal generator may further control the reference signal to change between a third level corresponding to a maximum image signal count value of the counter and a fourth level corresponding to a minimum image signal count value of the counter during an image signal period.

Alternatively, the image sensor may further include an output circuit configured to calculate a first difference between the maximum reset count value and the first count value and a second difference between the maximum image signal count value and a second count value and to output a final count value corresponding to a difference between the second difference and the first difference. At this time, the comparator may compare the image signal with the second reference signal and generate a second comparison signal and the counter may generate the second count value corresponding to the image signal based on the clock signal and the second comparison signal.

According to another exemplary embodiment of the inventive concept, there is provided a mobile computing device which may include the above image sensor and an application processor which is connected to the image sensor and configured to select a direction of the reference signal generated by the reference signal generator from among a ramping up direction from the first level to the second level and a ramping down direction from the second level to the first level using an application program installed thereon.

The mobile computing device may further include an image signal processor configured to generate brightness information based on image data, corresponding to the image signal, output from the image sensor, and set the direction of the reference signal generated from the reference signal generator based on the brightness information.

The application processor may be configured to provide a user interface allowing a user to select one of at least two modes of the mobile computing device corresponding to the ramping up direction and the ramping down direction, respectively.

In the above, a mode of the at least two modes corresponding to the ramping up direction may include a high-speed mode, and another mode of the at least two modes corresponding to the ramping down direction may include a low-power mode.

According to a further exemplary embodiment of the inventive concept, there is provided a method of operating an image sensor. The method may include generating a reference signal which changes between a first level corresponding to a maximum reset count value of a counter and a second level corresponding to a minimum reset count value of the counter during a reset signal period of the image sensor, comparing a reset signal output from a pixel with the reference signal to generate a first comparison signal as a result of the comparing, and generating a first count value corresponding to the reset signal based on a clock signal and the first comparison signal.

The method may further include controlling the reference signal to change between a third level corresponding to a maximum image signal count value of the counter and a fourth level corresponding to a minimum image signal count value of the counter during an image signal period, comparing an image signal output from the pixel with the reference signal that changes between the third level and the fourth level and generating a second comparison signal, and generating a second count value corresponding to the image signal based on the clock signal and the second comparison signal.

The method may further include calculating a first difference between the maximum reset count value and the first count value, calculating a second difference between the maximum image signal count value and the second count value, and outputting a final count value corresponding to a difference between the second difference and the first difference.

BRIEF DESCRIPTION OF THE DRAWINGS

The above and other features and advantages of the inventive concept will become more apparent by describing in detail exemplary embodiments thereof with reference to the attached drawings, in which.

DETAILED DESCRIPTION OF THE EXEMPLARY EMBODIMENTS

Figure 1:
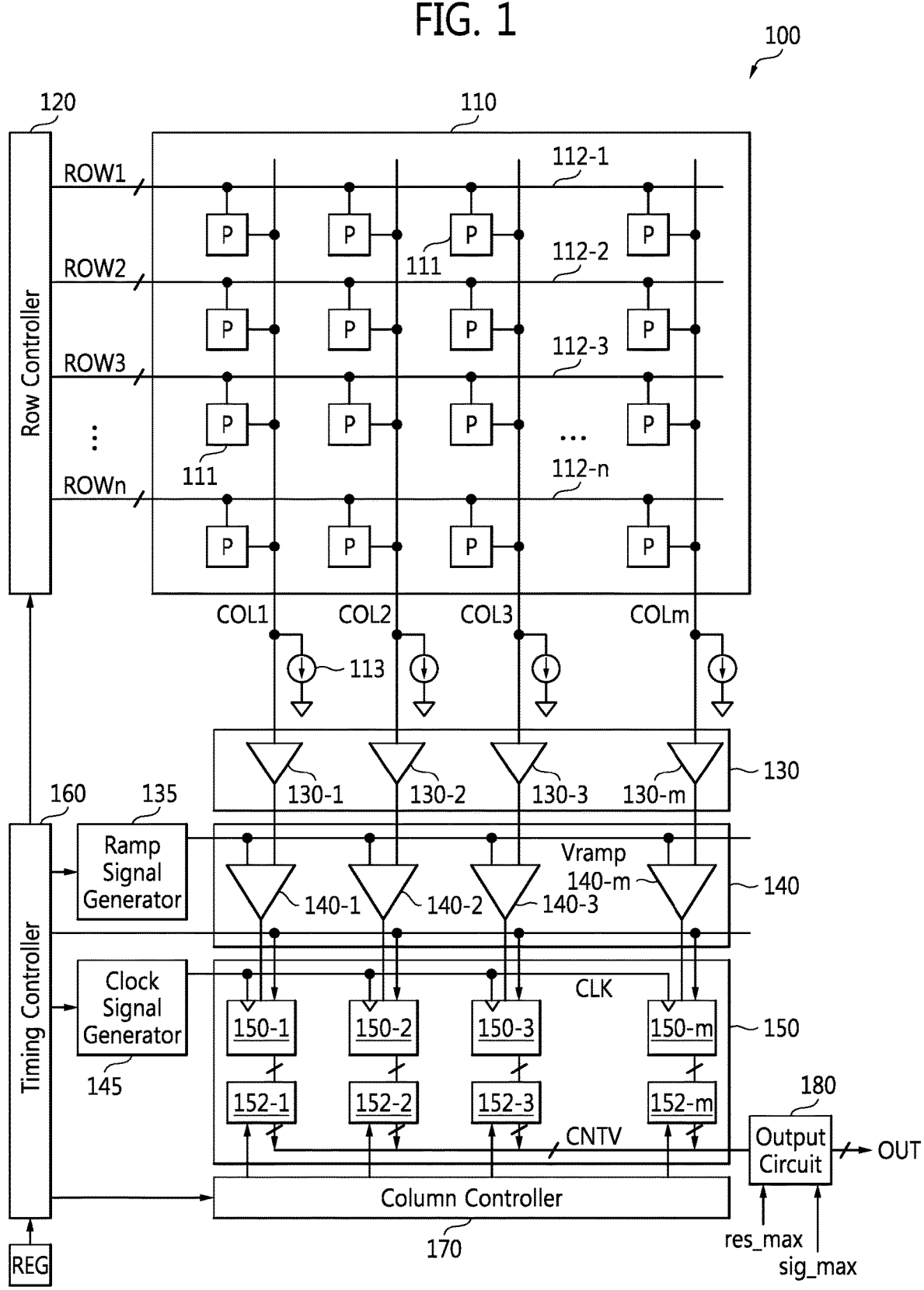
FIG. 1 is a block diagram of an image sensor according to an exemplary embodiment of the inventive concept.

The inventive concept now will be described more fully hereinafter with reference to the accompanying drawings, in which exemplary embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like reference numerals refer to like elements throughout this disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

"To determine from a low code" means herein to perform analog-to-digital (AD) conversion on a reset signal output from a pixel using a reference signal (e.g., a ramp signal) that changes (or ramps) from a level corresponding to a minimum reset count value of a counter or to perform AD conversion on an image signal output from the pixel using a reference signal (e.g., a ramp signal) that changes (or ramps) from a level corresponding to a minimum image signal count value of the counter. The determination from a low code will be described in detail with reference to FIGS. 5A and 6A.

"To determine from a high code" means herein to perform AD conversion on a reset signal output from a pixel using a ramp signal that ramps from a level corresponding to a maximum reset count value of a counter or to perform AD conversion on an image signal output from the pixel using a ramp signal that ramps from a level corresponding to a maximum image signal count value of the counter. The determination from a high code will be described in detail with reference to FIGS. 5B and 6B.

Determination from a low code may refer to AD conversion from a low code. Determination from a high code may refer to AD conversion from a high code. According to some embodiments of the inventive concept, an image sensor may basically perform determination from a high code. In other embodiments, an image sensor may selectively perform either determination from a low code or determination from a high code based on a selection signal.

FIG. 1 is a block diagram of an image sensor 100, according to an exemplary embodiment of the inventive concept. Referring to FIG. 1, the image sensor 100 may include a pixel array 110, a row controller 120, an amplifier circuit 130, a ramp signal generator 135, a comparator circuit 140, a clock signal generator 145, a counter circuit 150, a timing generator 160, a column controller 170, and an output circuit 180. An AD converter circuit may include the comparator circuit 140 and the counter circuit 150.

The image sensor 100 may also include a register REG that stores information about determination from a low code or determination from a high code. The register REG may be implemented as a special function register (SFR), but the inventive concept is not restricted to this example. The image sensor 100 may be a front side illumination (FSI) image sensor or a back side illumination (BSI) image sensor depending on whether a light receiving surface is at the front or back side of a substrate.

The pixel array 110 may be an active pixel sensor (APS) array. The pixel array 110 may include a plurality of pixels 111. The pixels 11 may include a red pixel, a green pixel, and a blue pixel, but the inventive concept is not restricted to the current embodiment. The pixels 111 may include a cyan pixel, a yellow pixel, a magenta pixel, or a white pixel.

A red pixel may generate a pixel signal (or charges) corresponding to a red signal in response to wavelengths in the red range of the visible spectrum. A green pixel may generate a pixel signal (or charges) corresponding to a green signal in response to wavelengths in the green range of the visible spectrum. A blue pixel may generate a pixel signal (or charges) corresponding to a blue signal in response to wavelengths in the blue range of the visible spectrum.

Some of the pixels 111 may be controlled to have a relatively long exposure time and the reset of the pixels 111 may be controlled to have a relatively short exposure time. Each of the pixels 111 may include a first photoelectric conversion element controlled with a long exposure time and a second photoelectric conversion element controlled with a short exposure time. In other words, each of the pixels 111 may include at least two photoelectric conversion elements.

Rows ROW1 through ROWn (where "n" is a natural number of at least 4) may respectively include control lines 112-1 through 112-n that control operations of the pixels 111 arranged in the rows ROW1 through ROWn. The row controller 120 may generate control signals for controlling operations of the pixels 111 in the rows ROW1 through ROWn according to a control of the timing generator 160. The row controller 120 may be a row driver.

Bias circuits 113 may be respectively connected to column lines COL1 through COLm (where "m" is a natural number of at least 4). Each of the bias circuits 113 may function as a constant current source.

The amplifier circuit 130 may receive and amplify pixel signals output from the column lines COL1 through COLm. The pixels 111 arranged in each of the column lines COL1 through COLm may be connected to a corresponding one of the column lines COL1 through COLm. The amplifier circuit 130 may include amplifiers 130-1 through 130-$m$. Each of the amplifiers 130-1 through 130-$m$ may receive and amplify a pixel signal output from one of the column lines COL1 through COLm.

The ramp signal generator 135 may generate a ramp signal Vramp that monotonously changes over time from a level corresponding to a maximum count value of counters 150-1 through 150-$m$ to a level corresponding to a minimum count value of the counters 150-1 through 150-$m$, according to a control of the timing generator 160. At this time, the ramp signal generator 135 generates the ramp signal Vramp for the determination from a high code.

In addition, the ramp signal generator 135 may generate a ramp signal Vramp that monotonously changes over time from a level corresponding to a minimum count value of counters 150-1 through 150-$m$ to a level corresponding to a maximum count value of the counters 150-1 through 150-$m$ according to the control of the timing generator 160. At this time, the ramp signal generator 135 generates a ramp signal Vramp for the determination from a low code.

Although the ramp signal generator 135 is illustrated and described as an example of a reference signal generator, the reference signal generator is not restricted to the ramp signal generator 135. The reference signal generator may be any type of signal generator that can generate a reference signal for the determination from a high or low code. The structure and operations of the ramp signal generator 135 will be described in detail with reference to FIGS. 3 through 6 later.

The comparator circuit 140 may convert analog signals amplified by the amplifier circuit 130 into digital signals. The comparator circuit 140 may include comparators 140-1 through 140-$m$. Each of the comparators 140-1 through 140-$m$ may convert an analog signal output from one of the amplifiers 130-1 through 130-$m$ into a digital signal based on the ramp signal Vramp.

Each of the comparators 140-1 through 140-$m$ may output a comparison signal that transits from a first level to a second level when a level of the ramp signal Vramp is equal to a level of an output signal of one of the amplifiers 130-1 through 130-$m$. A level transition time of the comparison signal may be determined depending on a level of a pixel signal output from one of the pixels 111. The first level may be either a high level or a low level and the second level may be the other.

The clock signal generator 145 may generate a clock signal CLK applied to the counter circuit 150. Generation timing and frequency of the clock signal CLK may be controlled by the timing generator 160. The counter circuit 150 may include the counters 150-1 through 150-$m$ and memories 152-1 through 152-$m$. Each of the counters 150-1 through 150-$m$ may count the level transition time of the comparison signal output from one of the comparators 140-1 through 140-$m$ in response to the clock signal CLK and may output a count value CNTV.

Each of the counters 150-1 through 150-$m$ may be implemented as an up-counter or a down-counter. It is assumed that the counters 150-1 through 150-*m* are up-counters in the current embodiment. In other words, each of the counters 150-1 through 150-*m* may output the count value CNTV that sequentially increases till the level transition time of the comparison signal and may hold the count value CNTV at the level transition time.

However, when the counters 150-1 through 150-*m* are implemented as down-counters, the counters 150-1 through 150-*m* may operate in the manner opposite to the up-counters. The counters 150-1 through 150-*m* may be implemented as K-bit up-counters, where K is a natural number of at least 2. For instance, the counters 150-1 through 150-*m* may be 10-bit up-counters or 12-bit up-counters but are not restricted thereto.

Each of the memories 152-1 through 152-*m* may store the count value CNTV output from each of the counters 150-1 through 150-*m*. Each of the memories 152-1 through 152-*m* may be implemented as static random access memory (SRAM), a latch, a flip-flop, or a combination thereof, but the inventive concept is not restricted to the current embodiment. When the count value CNTV is composed of K bits, each of the memories 152-1 through 152-*m* may store K bits. A clock signal for controlling operations of the memories 152-1 through 152-*m* may be generated by the clock signal generator 145 or the timing generator 160. The clock signal may be different from the clock signal CLK.

The timing generator 160 may generate control signals for controlling the operations of the row controller 120, the ramp signal generator 135, the clock signal generator 145, the counter circuit 150, and the column controller 170. The operation of the timing generator 160 may be controlled according to values stored in the register REG. The values stored in the register REG may be programmed or set by an external device.

The column controller 170 may control an output timing of the count value CNTV stored in each of the memories 152-1 through 152-*m* according to the control of the timing generator 160. The memories 152-1 through 152-*m* may sequentially output the count value CNTV to the output circuit 180 according to a control of the column controller 170.

During the determination from a high code, the output circuit 180 may receive the count value CNTV from one of the memories 152-1 through 152-*m*, and may generate a final count value OUT based on the count value CNTV, a maximum reset count value res_max, and a maximum image signal count value sig_max. Operations of the output circuit 180 will be described in detail with reference to FIGS. 5A through 6B. However, during the determination from a low code, the output circuit 180 may output the count value CNTV from one of the memories 152-1 through 152-*m* as the final count value OUT.

The maximum reset count value res_max and the maximum image signal count value sig_max may be output from the timing generator 160. The maximum reset count value res_max and the maximum image signal count value sig_max may be stored in the register REG that can be accessed by the timing generator 160.

Figure 2:
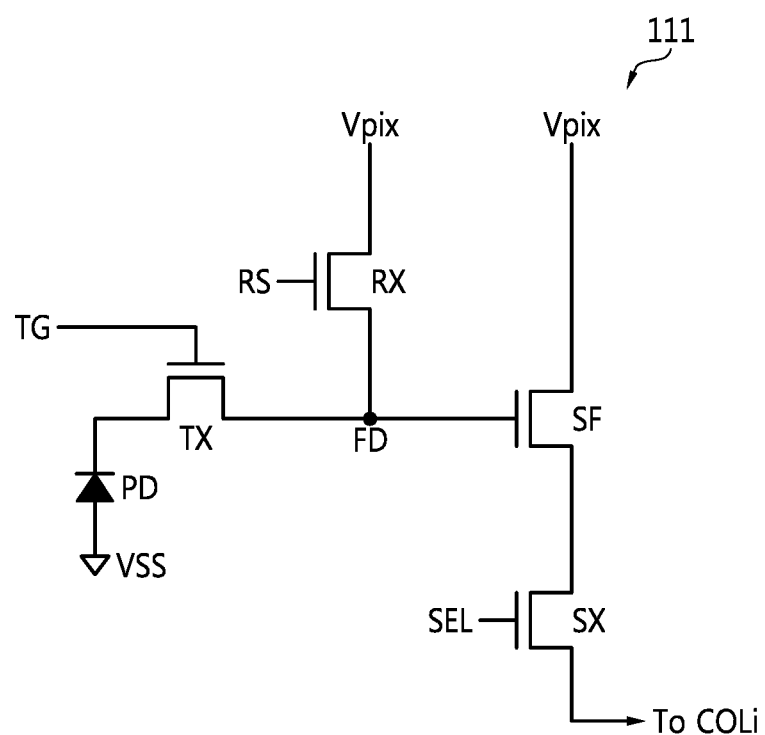
FIG. 2 is a circuit diagram of a pixel illustrated in FIG. 1 according to an exemplary embodiment of the inventive concept.

FIG. 2 is a circuit diagram of a pixel 111 illustrated in FIG. 1 according to an exemplary embodiment of the inventive concept. Referring to FIGS. 1 and 2, the structure and operations are substantially the same or similar among the pixels 111 illustrated in FIG. 1. The pixel 111 may include one photoelectric conversion element PD and four transistors TX, RX, SF, and SX. According to another exemplary embodiment, the pixel 111 may include one photoelectric conversion element PD and three or five transistors.

The photoelectric conversion element PD may be implemented as a photodiode, a phototransistor, a photogate, or a pinned photodiode. The photoelectric conversion element PD may generate charges (e.g., electrons and/or holes) in response to light coming through a filter. The filter may be a red filter, a green filter, or a blue filter but is not restricted thereto. A reference character Vpix may denote an operating voltage and a reference character VSS may denote a ground voltage.

The transfer transistor TX may transfer charges generated by the photoelectric conversion element PD to a floating diffusion region FD in response to a transfer control signal TG. The reset transistor RX may reset the floating diffusion region FD in response to a reset signal RS. The source follower SF may perform source following in response to a voltage corresponding to charges accumulated at the floating diffusion region FD. The select transistor SX may output a signal output from the source follower SF as a pixel signal to a corresponding column line COLi (where 1≤i≤m) in response to a selection signal SEL.

Enabling or disabling timings of the control signals TG, RS, and SEL may be controlled by the row controller 120 controlled by the timing generator 160. Enabling may be transition from either a low level or a high level to the other level and disabling may be reverse transition. The control signals TG, RS, and SEL may be transmitted to the pixel 111 through the control lines 112-1 through 112-*n* arranged in the respective rows ROW1 through ROWn.

Figure 3:
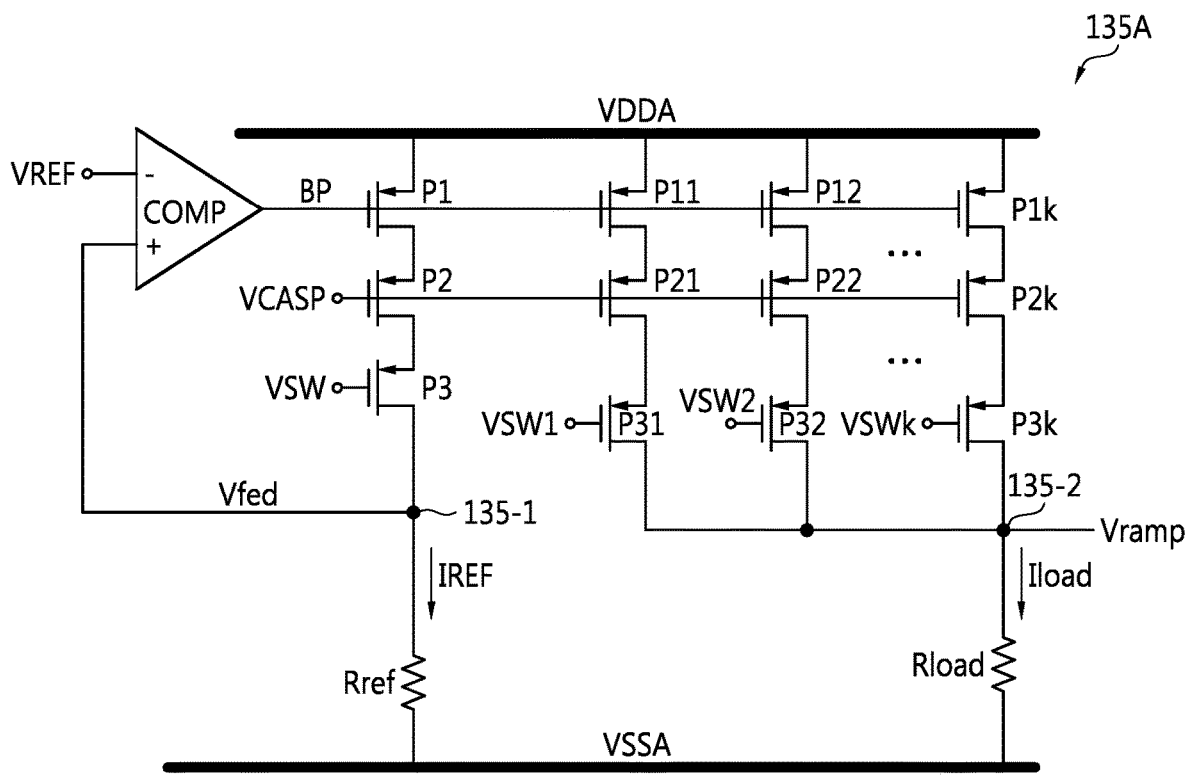
FIG. 3 is a circuit diagram of an example of a ramp signal generator illustrated in FIG. 1.

FIG. 3 is a circuit diagram of an example 135A of the ramp signal generator 135 illustrated in FIG. 1. Referring to FIG. 3, the ramp signal generator 135A may be implemented as a current digital-to-analog (DA) converter type ramp signal generator. For instance, the ramp signal generator 135A may generate the ramp signal Vramp using a current mirror. A comparator COMP may compare a reference voltage VREF with a feedback voltage Vfed, and generate a switch signal BP corresponding to a comparison result.

Transistors P1 through P3 included in a biasing branch are connected in series between a first line for supplying an operating voltage VDDA and a first node 135-1. A reference resistor Rref is connected between the first node 135-1 and a second line for the supply of a ground voltage VSSA. A reference current IREF flows across the reference resistor Rref.

P-channel metal oxide semiconductor (PMOS) transistors P11, P21, and P31 included in a first mirror branch are connected in series between the first line and a second node 135-2. PMOS transistors P12, P22, and P32 included in a second mirror branch are connected in series between the first line and the second node 135-2. PMOS transistors P1*k*, P2*k*, and P3*k* included in a k-th (where "k" is a natural number of at least 3) mirror branch are connected in series between the first line and the second node 135-2. A load resistor Rload is connected between the second node 135-2 and the second line. Although the PMOS transistors P1 through P3, P11 through P1*k*, P21 through P2*k*, and P31 through P3*k* are illustrated in FIG. 3, they are just examples.

Control signals VCASP, VSW, and VSW1 through VSW*k* may be output from the timing generator 160. Enabling timings and disabling timings of the control signals VCASP, VSW, and VSW1 through VSW*k* may be controlled by the timing generator 160. It is assumed that biasing signals BP, VCASP and VSW are at a low level. Accordingly, the PMOS transistors P1 through P3, P11 through P1*k*, and P21 through P2*k* may be turned on.

In a first case CASE1, the switch signals VSW1 through VSW*k* are at a high level H before a first time point T1, and therefore, the PMOS transistors P31 through P3k remain in an off-state. When the switch signal VSW1 transits from the high level H to a low level L at the first time point T1, only the PMOS transistor P31 is turned on. Accordingly, a first mirror current corresponding to the reference current IREF flows in the load resistor Rload through the first mirror branch. As a result, the level of the ramp signal Vramp is determined by the first mirror current and the resistance of the load resistor Rload.

When the switch signal VSW2 transits from the high level H to the low level L at a second time point T2, the PMOS transistor P32 is turned on. Accordingly, a second mirror current corresponding to the reference current IREF flows in the second mirror branch and a current Iload corresponding to the sum of the first mirror current and the second mirror current flows in the load resistor Rload. In other words, the current Iload corresponding to 2×IREF flows in the load resistor Rload. Therefore, the level of the ramp signal Vramp is determined by 2×IREF and the resistance of the load resistor Rload.

When the switch signal VSWk transits from the high level H to the low level L at a k-th time point Tk, the PMOS transistor P3k is turned on. Accordingly, a k-th mirror current corresponding to the reference current IREF flows in the k-th mirror branch and the current Iload corresponding to a sum of the first through k-th mirror currents flows in the load resistor Rload. In other words, the current Iload corresponding to k×IREF flows in the load resistor Rload. Therefore, the level of the ramp signal Vramp is determined by k×IREF and the resistance of the load resistor Rload.

In other words, when the PMOS transistors P31 through P3k are sequentially turned on, the ramp signal generator 135A may generate the ramp signal Vramp that monotonously increases over time. The ramp signal generator 135A may generate the ramp signal Vramp that can be used for the determination from a high code. It is assumed that the PMOS transistors P31 through P3k have the same physical characteristics.

In a second case CASE2, the switch signals VSW1 through VSWk are at the low level L before the first time point T1, and therefore, the PMOS transistors P31 through P3k remain in an on-state. In other words, before the first time point T1, the current Iload corresponding to k×IREF flows in the load resistor Rload, and therefore, the level of the ramp signal Vramp is determined by the current Iload (=k×IREF) flowing in the load resistor Rload and the resistance of the load resistor Rload.

When the switch signal VSW1 transits from the low level L to the high level H at the first time point T1, only the PMOS transistor P31 is turned off. Accordingly, the first mirror current corresponding to the reference current IREF is not generated in the first mirror branch. The level of the ramp signal Vramp is determined by the current Iload (=(k−1)×IREF) flowing in the load resistor Rload and the resistance of the load resistor Rload.

When the switch signal VSW2 transits from the low level L to the high level H at the second time point T2, the PMOS transistor P32 is turned off. Accordingly, the second mirror current corresponding to the reference current IREF is not generated in the second mirror branch. The level of the ramp signal Vramp is determined by the current Iload (=(k−2)×IREF) flowing in the load resistor Rload and the resistance of the load resistor Rload.

When the switch signal VSWk transits from the low level L to the high level H at the k-th time point Tk, the PMOS transistor P3k is turned off. The k-th mirror current corresponding to the reference current IREF is not generated in the k-th mirror branch. The level of the ramp signal Vramp is determined by the current Iload (=(k−k)× IREF) flowing in the load resistor Rload and the resistance of the load resistor Rload.

In other words, when the PMOS transistors P31 through P3k are sequentially turned off, the ramp signal generator 135A may generate the ramp signal Vramp that monotonously decreases over time. The ramp signal generator 135A may generate the ramp signal Vramp that can be used for the determination from a low code.

As described above with reference to FIG. 3, when the enabling and disabling timings of the switch signals VSW1 through VSWk are appropriately adjusted, the ramp signal generator 135A may generate the ramp signal Vramp that increases or decreases over time. In addition, when the number of the switch signals VSW1 through VSWk enabled and/or disabled is appropriately adjusted, the ramp signal generator 135A may adjust the maximum or minimum level of the ramp signal Vramp.

Figure 4:
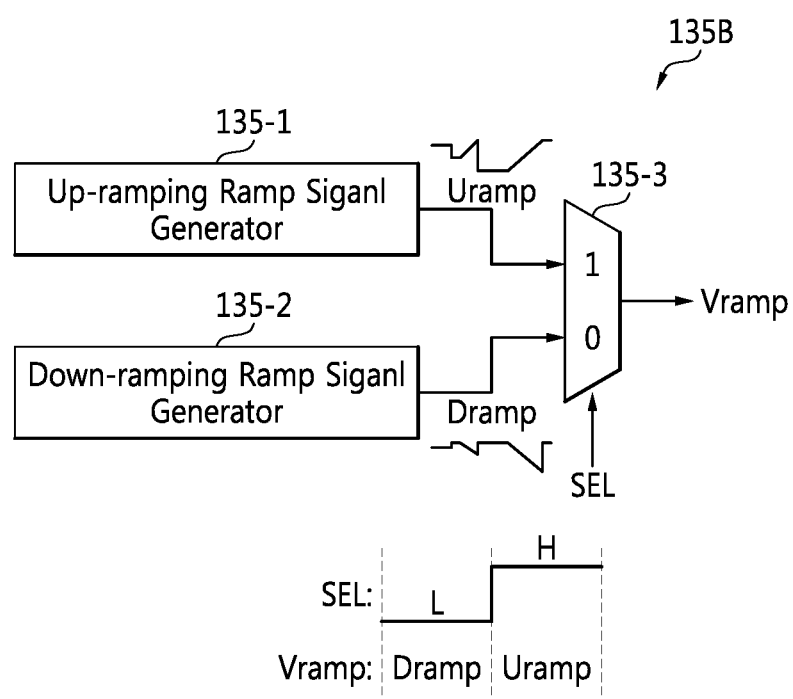
FIG. 4 is a circuit diagram of another example of the ramp signal generator illustrated in FIG. 1.

FIG. 4 is a circuit diagram of another example 135B of the ramp signal generator 135 illustrated in FIG. 1. Referring to FIG. 4, the ramp signal generator 135B may include an up-ramping ramp signal generator 135-1, a down-ramping ramp signal generator 135-2, and a selection circuit 135-3.

The up-ramping ramp signal generator 135-1 may generate a first ramp signal Uramp which ramps up. The down-ramping ramp signal generator 135-2 may generate a second ramp signal Dramp which ramps down. Enabling of the up-ramping ramp signal generator 135-1 and generation timing of the first ramp signal Uramp may be controlled by the timing generator 160. Enabling of the down-ramping ramp signal generator 135-2 and generation timing of the second ramp signal Dramp may also be controlled by the timing generator 160.

The selection circuit 135-3 may output either the first ramp signal Uramp or the second ramp signal Dramp as the ramp signal Vramp in response to the selection signal SEL. For instance, when the selection signal SEL is at the low level L or is logic 0, the selection circuit 135-3 may output the second ramp signal Dramp. The selection circuit 135-3 may be implemented as a multiplexer. When the selection signal SEL is at the high level H or is logic 1, the selection circuit 135-3 may output the first ramp signal Uramp. The selection signal SEL may be output from the timing generator 160. Information regarding the generation of the selection signal SEL may be programmed or set in the register REG.

When there is a request for a low-power operation, the selection signal SEL may be generated at the low level L and the second ramp signal Dramp output from the down-ramping ramp signal generator 135-2 may be selected as the ramp signal Vramp. When there is a request for a high-speed operation or for the improvement of picture quality, the selection signal SEL may be generated at the high level H and the first ramp signal Uramp output from the up-ramping ramp signal generator 135-1 may be selected as the ramp signal Vramp.

Figures 5A, 5B:
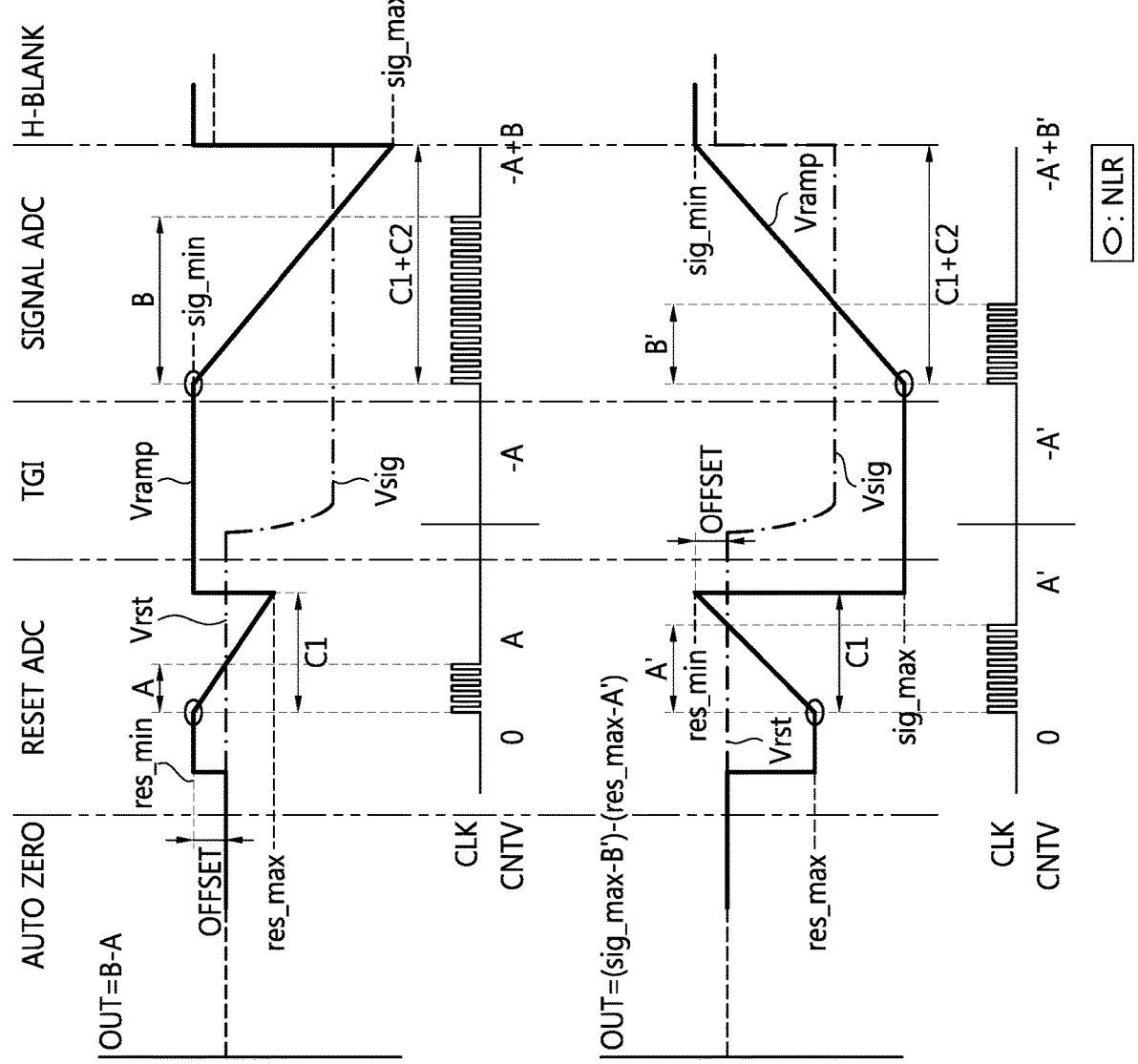
FIGS. 5A and 5B are conceptual diagrams for explaining analog-to-digital (AD) conversion performed based on a ramp signal in an image sensor using electrons output from a photoelectric conversion element of a pixel, according to exemplary embodiments of the inventive concept.

FIGS. 5A and 5B are conceptual diagrams for explaining AD conversion performed based on a ramp signal in an image sensor using electrons output from a photoelectric conversion element of a pixel. A pixel signal output from the pixel 111 may include a reset signal Vrst and an image signal Vsig.

A 1-horizontal time may include an auto zero period AUTO ZERO, a reset signal AD conversion (ADC) period RESET ADC, a transfer control signal enabling period TGI, an image signal ADC period SIGNAL ADC, and a horizontal blank period H-BLANK. When a frame rate is Z (where Z is a natural number of at least 2), the 1-horizontal time may be defined as 1/(Z×n), where "n" may be the number of rows in the pixel array 110. The 1-horizontal time may refer to a time needed to convert pixel signals corresponding to a line or pixel signals output from pixels in a row from an analog format into a digital format.

The auto zero period AUTO ZERO may be a duration (or interval) necessary to determine a decision point of each of the comparators 140-1 through 140-m included in the comparator circuit 140. The decision point may be for ADC, and the auto zero period AUTO ZERO may be a duration necessary to store or determine an offset of each of the comparators 140-1 through 140-m. The reset signal ADC period RESET ADC may be a duration in which the reset signal Vrst is converted into a digital signal based on the ramp signal Vramp. The transfer control signal enabling period TGI may be a duration while the transfer control signal TG is enabled. The image signal ADC period SIGNAL ADC may be a duration while the image signal Vsig is converted into a digital signal based on the ramp signal Vramp. The horizontal blank period H-BLANK may be a duration while ADC for the next line is prepared. The reset signal ADC period RESET ADC may be simply referred to as a "reset signal period" and the image signal ADC period SIGNAL ADC may be simply referred to as an "image signal period."

FIG. 5A illustrates an example of the determination from a low code. "OFFSET" may denote an offset of the ramp signal Vramp. The counter 150-1 may generically refer to the counters 150-1 through 150-m, and the memory 152-1 may generically refer to the memories 152-1 through 152-m. A reference character C1 may denote the maximum cycle of the clock signal CLK applied to the counter 150-1 during the reset signal ADC period RESET ADC and "C1+C2" may denote the maximum cycle of the clock signal CLK applied to the counter 150-1 during the image signal ADC period SIGNAL ADC. When C1 is 256, C2 may be 1024, but these are just examples.

Referring to FIG. 5A, the ramp signal generator 135 may output the ramp signal Vramp that (monotonously) decreases over time from a second level corresponding to a minimum reset count value res_min of the counter 150-1 down to a first level corresponding to a maximum reset count value res_max of the counter 150-1 during the reset signal ADC period RESET ADC. At this time, the ramp signal Vramp is referred to as a down-ramping ramp signal or a ramp signal for the determination from a low code. A down-ramping ramp signal may be generated according to the second case CASE2 illustrated in FIG. 3 or may be generated by the down-ramping ramp signal generator 135-2 illustrated in FIG. 4.

The counter 150-1 may generate the count value CNTV that increases sequentially from "0" to "A" in response to the clock signal CLK and a comparison signal output from the comparator 140-1 until the level of the reset signal Vrst is equal to the level of the ramp signal Vramp. The memory 152-1 may store "A" as the count value CNTV generated by the counter 150-1. In other words, when the level of the reset signal Vrst is the same as the level of the ramp signal Vramp, the counter 150-1 may hold "A" as the count value CNTV.

The pixel 111 may output a pixel signal corresponding to the image signal Vsig during the transfer control signal enabling period TGI. The counter 150-1 or the memory 152-1 may generate "−A", i.e., ones' complement of "A", during the transfer control signal enabling period TGI. A method of generating "−A" in the image sensor 100 may be variously modified in different embodiments.

The ramp signal generator 135 may output the ramp signal Vramp that (monotonously) decreases over time from a fourth level corresponding to a minimum image signal count value sig_min of the counter 150-1 down to a third level corresponding to a maximum image signal count value sig_max of the counter 150-1 during the image signal ADC period SIGNAL ADC. In other words, the ramp signal generator 135 may output the ramp signal Vramp that can be used for the determination from a low code. Here, according to an exemplary embodiment, the ramp signal Vramp may be a single reference signal that changes over time between the second, first, fourth and third levels during the reset signal ADC period RESET ADC through the image signal ADC period SIGNAL ADC in the case of FIG. 5A. However, according to another exemplary embodiment, the ramp signal generator 135 may output two different ramp signals, one changing between the second and first levels during the reset signal ADC period RESET ADC, and another changing between the fourth and third levels during the image signal ADC period SIGNAL ADC in the case of FIG. 5A.

The counter 150-1 may generate the count value CNTV that increases sequentially from "−A" to "B" in response to the clock signal CLK and a comparison signal output from the comparator 140-1 until the level of the image signal Vsig is equal to the level of the ramp signal Vramp. The memory 152-1 may store a count value corresponding to "−A+B" as the count value CNTV. Accordingly, the output circuit 180 may output the final count value OUT (=B−A).

The image sensor 100 using single-slope ADC may perform ADC sequentially from a low code, as shown in FIG. 5A. Nonlinearity of a low code region may be amplified and increased due to gamma gain or the like.

It takes a lot of time for an output signal of the comparator 140-1 or a pixel signal of the pixel 111 to be stabilized right after the auto zero period AUTO ZERO (or right before the reset signal ADC period RESET ADC) or right after the transfer control signal enabling period TGI (or right before the image signal ADC period SIGNAL ADC). When ADC is performed on the pixel signal of the pixel 111 in a state where the output signal of the comparator 140-1 or the pixel signal of the pixel 111 has not been stabilized, a nonlinear ADC value may be output from the low code region. In FIGS. 5A and 5B, "NLR" denotes a nonlinear region.

FIG. 5B illustrates an example of the determination from a high code. Referring to FIG. 5B, the ramp signal generator 135 may output the ramp signal Vramp that (monotonously) increases over time from the first level corresponding to the maximum reset count value res_max of the counter 150-1 up to the second level corresponding to the minimum reset count value res_min of the counter 150-1 during the reset signal ADC period RESET ADC. At this time, the ramp signal Vramp is referred to as an up-ramping ramp signal or a ramp signal for the determination from a high code. An up-ramping ramp signal may be generated according to the first case CASE1 illustrated in FIG. 3 or may be generated by the up-ramping ramp signal generator 135-1 illustrated in FIG. 4.

The counter 150-1 may generate the count value CNTV that increases sequentially from "0" to "A'" in response to the clock signal CLK and a comparison signal output from the comparator 140-1 until the level of the reset signal Vrst is equal to the level of the ramp signal Vramp. The memory 152-1 may store "A'" as the count value CNTV generated by the counter 150-1.

The pixel 111 may output a pixel signal corresponding to the image signal Vsig during the transfer control signal enabling period TGI. The counter 150-1 or the memory 152-1 may generate "−A'", i.e., ones' complement of "A'", during the transfer control signal enabling period TGI. A method of generating "−A'" in the image sensor 100 may be variously modified in different embodiments.

The ramp signal generator 135 may output the ramp signal Vramp that (monotonously) increases over time from the third level corresponding to the maximum image signal count value sig_max of the counter 150-1 up to the fourth level corresponding to the minimum image signal count value sig_min of the counter 150-1 during the image signal ADC period SIGNAL ADC. In other words, the ramp signal generator 135 may output the ramp signal Vramp that can be used for the determination from a high code. Here, according to an exemplary embodiment, the ramp signal Vramp may be a single reference signal that changes over time between the first, second, third and fourth levels during the reset signal ADC period RESET ADC through the image signal ADC period SIGNAL ADC in the case of FIG. 5B. However, according to another exemplary embodiment, the ramp signal generator 135 may output two different ramp signals, one changing between the first and second levels during the reset signal ADC period RESET ADC, and another changing between the third and fourth levels during the image signal ADC period SIGNAL ADC in the case of FIG. 5B.

The counter 150-1 may generate the count value CNTV that increases sequentially from "−A'" to "B'" in response to the clock signal CLK and a comparison signal output from the comparator 140-1 until the level of the image signal Vsig is equal to the level of the ramp signal Vramp. The memory 152-1 may store a count value corresponding to "−A'+B'" as the count value CNTV.

During the determination from a high code, the output circuit 180 may calculate a second difference sig_max−B' between the maximum image signal count value sig_max and the count value B', may calculate a first difference res_max−A' between the maximum reset count value res_max and the count value A', and may output the final count value OUT corresponding to a difference between the second difference sig_max−B' and the first difference res_max−A'. The first difference res_max−A' may refer to a reset count value and the second difference sig_max−B' may refer to an image signal count value. Referring to FIG. 5B, the comparator 140-1 performs ADC starting from a high code, so that noise characteristics occurring in the low code region are improved.

Figures 6A, 6B:
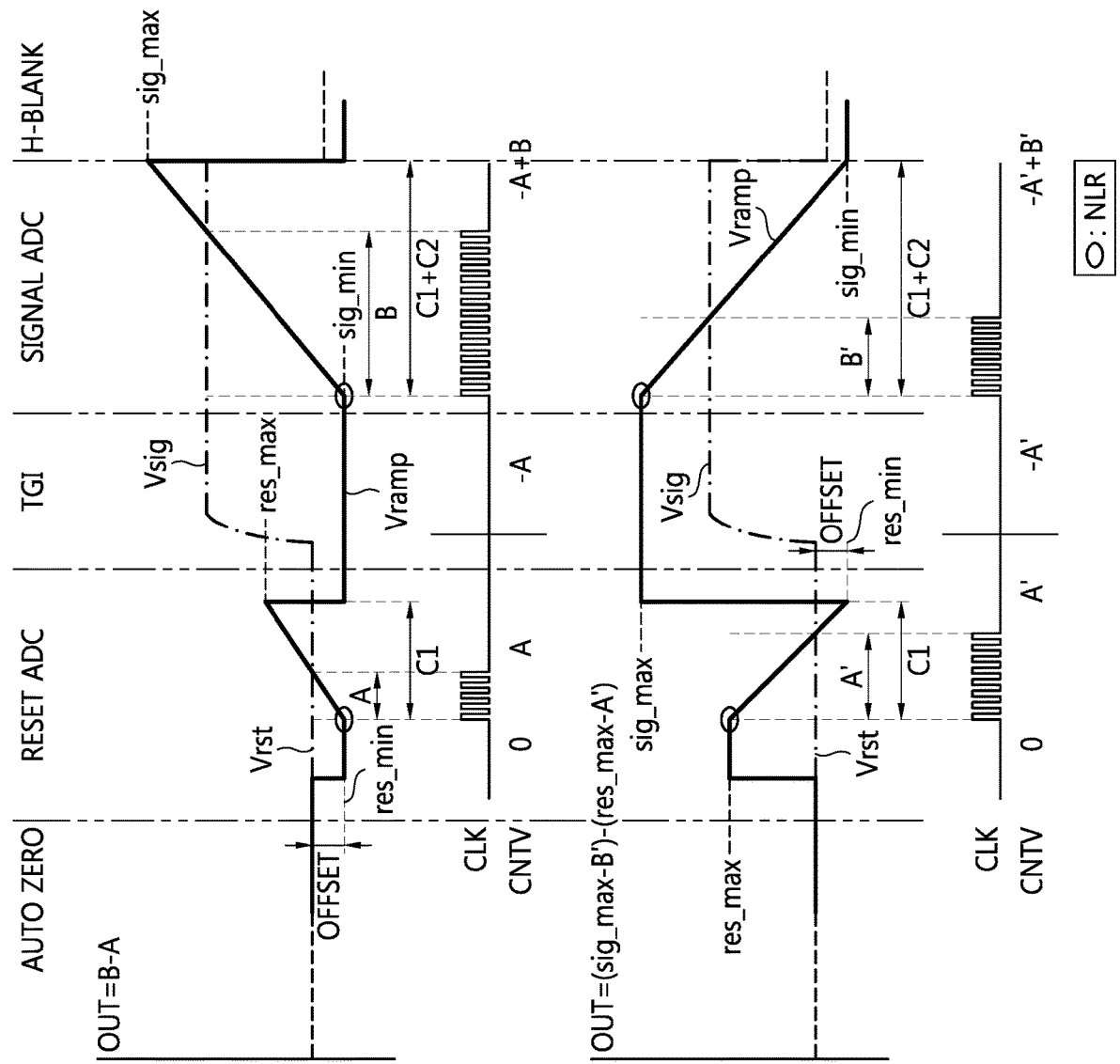
FIGS. 6A and 6B are conceptual diagrams for explaining AD conversion performed based on a ramp signal in an image sensor using holes output from a photoelectric conversion element of a pixel, according to exemplary embodiments of the inventive concept.

FIGS. 6A and 6B are conceptual diagrams for explaining ADC performed based on a ramp signal in an image sensor using holes output from a photoelectric conversion element of a pixel. FIG. 6A illustrates an example of the determination from a low code.

Referring to FIG. 6A, the ramp signal generator 135 may output the ramp signal Vramp that (monotonously) increases over time from the second level corresponding to the minimum reset count value res_min of the counter 150-1 to the first level corresponding to the maximum reset count value res_max of the counter 150-1 during the reset signal ADC period RESET ADC. At this time, the ramp signal Vramp is referred to as an up-ramping ramp signal or a ramp signal for the determination from a low code. An up-ramping ramp signal may be generated according to the first case CASE1 illustrated in FIG. 3 or may be generated by the up-ramping ramp signal generator 135-1 illustrated in FIG. 4.

The counter 150-1 may generate the count value CNTV that increases sequentially from "0" to "A" in response to the clock signal CLK and a comparison signal output from the comparator 140-1 until the level of the reset signal Vrst is equal to the level of the ramp signal Vramp. The memory 152-1 may store "A" as the count value CNTV generated by the counter 150-1. In other words, when the level of the reset signal Vrst is the same as the level of the ramp signal Vramp, the counter 150-1 may hold "A" as the count value CNTV.

The pixel 111 may output a pixel signal corresponding to the image signal Vsig during the transfer control signal enabling period TGI. The counter 150-1 or the memory 152-1 may generate "−A", i.e., ones' complement of "A", during the transfer control signal enabling period TGI. A method of generating "−A" in the image sensor 100 may be variously modified in different embodiments.

The ramp signal generator 135 may output the ramp signal Vramp that (monotonously) increases over time from the fourth level corresponding to the minimum image signal count value sig_min of the counter 150-1 to the third level corresponding to the maximum image signal count value sig_max of the counter 150-1 during the image signal ADC period SIGNAL ADC. In other words, the ramp signal generator 135 may output the ramp signal Vramp that can be used for the determination from a low code.

The counter 150-1 may generate the count value CNTV that increases sequentially from "−A" to "B" in response to the clock signal CLK and a comparison signal output from the comparator 140-1 until the level of the image signal Vsig is equal to the level of the ramp signal Vramp. The memory 152-1 may store a count value corresponding to "−A+B" as the count value CNTV. Accordingly, the output circuit 180 may output the final count value OUT (=B−A).

FIG. 6B illustrates an example of the determination from a high code. Referring to FIG. 6B, the ramp signal generator 135 may output the ramp signal Vramp that (monotonously) decreases over time from the first level corresponding to the maximum reset count value res_max of the counter 150-1 to the second level corresponding to the minimum reset count value res_min of the counter 150-1 during the reset signal ADC period RESET ADC. At this time, the ramp signal Vramp is referred to as a down-ramping ramp signal or a ramp signal for the determination from a high code. A down-ramping ramp signal may be generated according to the second case CASE2 illustrated in FIG. 3 or may be generated by the down-ramping ramp signal generator 135-2 illustrated in FIG. 4.

The counter 150-1 may generate the count value CNTV that increases sequentially from "0" to "A'" in response to the clock signal CLK and a comparison signal output from the comparator 140-1 until the level of the reset signal Vrst is equal to the level of the ramp signal Vramp. The memory 152-1 may store "A'" as the count value CNTV generated by the counter 150-1.

The pixel 111 may output a pixel signal corresponding to the image signal Vsig during the transfer control signal enabling period TGI. The counter 150-1 or the memory 152-1 may generate "−A'", i.e., ones' complement of "A'", during the transfer control signal enabling period TGI.

The ramp signal generator 135 may output the ramp signal Vramp that (monotonously) decreases over time from the third level corresponding to the maximum image signal count value sig_max of the counter 150-1 to the fourth level corresponding to the minimum image signal count value sig_min of the counter 150-1 during the image signal ADC period SIGNAL ADC. In other words, the ramp signal generator 135 may output the ramp signal Vramp that can be used for the determination from a high code.

The counter 150-1 may generate the count value CNTV that increases sequentially from "−A'" to "B'" in response to the clock signal CLK and a comparison signal output from the comparator 140-1 until the level of the image signal Vsig is equal to the level of the ramp signal Vramp. The memory 152-1 may store a count value corresponding to "−A'+B'" as the count value CNTV.

During the determination from a high code, the output circuit 180 may calculate the second difference sig_max−B' between the maximum image signal count value sig_max and the count value B', may calculate the first difference res_max−A' between the maximum reset count value res_max and the count value A', and may output the final count value OUT corresponding to a difference between the second difference sig_max−B' and the first difference res_max−A'.

Figure 7:
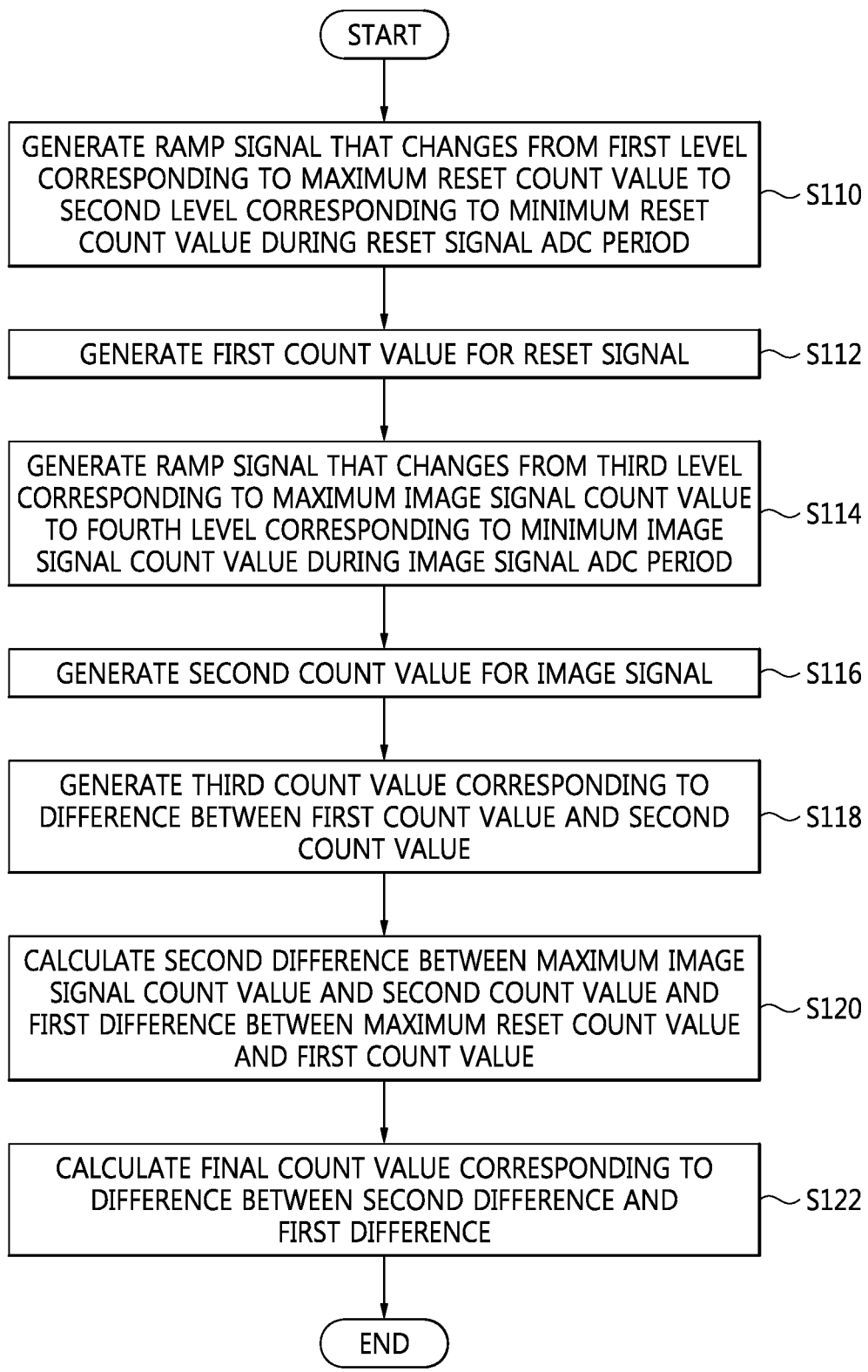
FIG. 7 is a flowchart of a method of operating the image sensor illustrated in FIG. 1 according to an exemplary embodiment of the inventive concept.

FIG. 7 is a flowchart of a method of operating the image sensor 100 illustrated in FIG. 1 according to an exemplary embodiment of the inventive concept. The operations of the image sensor 100 determining from a high code will be described with reference to FIGS. 1 through 7.

The ramp signal generator 135 may generate the ramp signal Vramp that changes from the first level corresponding to the maximum reset count value res_max to the second level corresponding to the minimum reset count value res_min during the reset signal ADC period RESET ADC in operation S110.

As shown in FIG. 5B, the ramp signal generator 135 may generate the ramp signal Vramp that (monotonously) increases over time from the first level corresponding to the maximum reset count value res_max to the second level corresponding to the minimum reset count value res_min in operation S110. As shown in FIG. 6B, the ramp signal generator 135 may generate the ramp signal Vramp that (monotonously) decreases over time from the first level corresponding to the maximum reset count value res_max to the second level corresponding to the minimum reset count value res_min in operation S110.

The counter 150-1 may generate a first count value of A' based on the clock signal CLK and a comparison signal output from the comparator 140-1, and the memory 152-1 may store the first count value A' in operation S112.

The ramp signal generator 135 may generate the ramp signal Vramp that changes from the third level corresponding to the maximum image signal count value sig_max to the fourth level corresponding to the minimum image signal count value sig_min during the image signal ADC period SIGNAL ADC in operation S114.

As shown in FIG. 5B, the ramp signal generator 135 may generate the ramp signal Vramp that (monotonously) increases over time from the third level corresponding to the maximum image signal count value sig_max to the fourth level corresponding to the minimum image signal count value sig_min in operation S114. As shown in FIG. 6B, the ramp signal generator 135 may generate the ramp signal Vramp that (monotonously) decreases over time from the third level corresponding to the maximum image signal count value sig_max to the fourth level corresponding to the minimum image signal count value sig_min in operation S114.

The counter 150-1 may generate a second count value of B' based on the clock signal CLK and a comparison signal output from the comparator 140-1 and the memory 152-1 may store the second count value B' in operation S116. According to an exemplary embodiment, the counter 150-1 may also generate a third count value of −A'+B' corresponding to a difference between the first count value A' and the second count value B', and the memory 152-1 may store the third count value of −A'+B' in operation S118.

The output circuit 180 may calculate the second difference sig_max−B' between the maximum image signal count value sig_max and the second count value B' and the first difference res_max−A' between the maximum reset count value res_max and the first count value A' in operation S120. The output circuit 180 may generate the final count value OUT corresponding to the difference between the second difference sig_max−B' and the first difference res_max−A' in operation S122.

Figure 8:
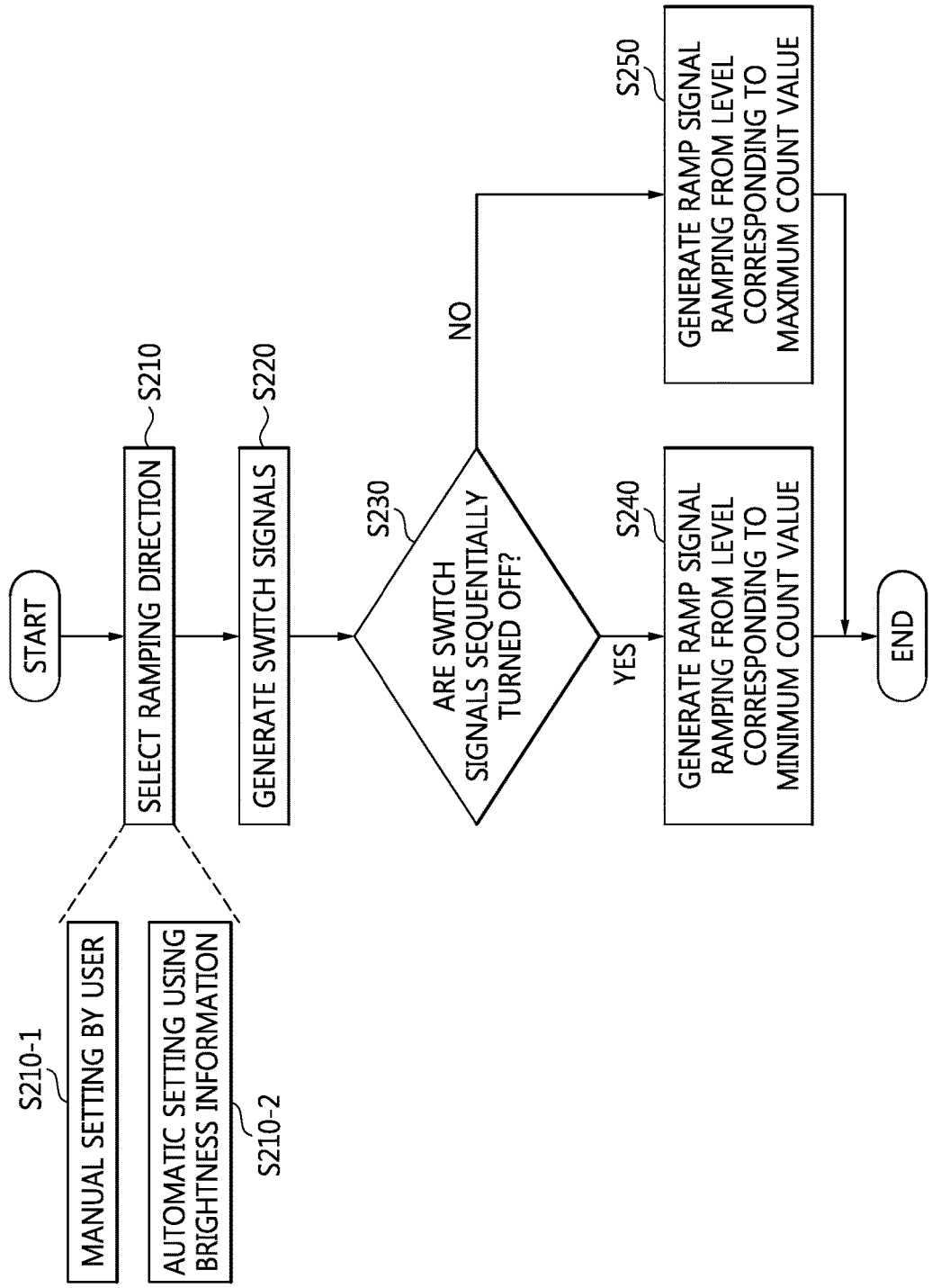
FIG. 8 is a flowchart of an operation of the ramp signal generator illustrated in FIG. 3, according to an exemplary embodiment of the inventive concept.

FIG. 8 is a flowchart of an operation of the ramp signal generator 135 illustrated in FIG. 3. Referring to FIGS. 1 and 3, FIGS. 5A through 6B, and FIG. 8, whether to generate an up-ramping ramp signal or a down-ramping ramp signal may be determined in operation S210. In other words, the ramp signal generator 135 may generate a ramp signal used for the determination from a low code or a ramp signal used for the determination from a high code according to the control of the timing generator 160 in operation S210.

The ramping direction may be manually set by a user in operation S210-1. The user may set the ramping direction using an application program APP executed by an application processor (e.g., 230A in FIG. 10 of 230B in FIG. 11). For instance, when a user wants a low-power operation, the user may select a user input using the application program APP so that a ramp signal used for the determination from a high or low code is generated. Information corresponding to the user input may be programmed or set in the register REG of the image sensor 100.

Alternatively, the ramping direction may be automatically set based on brightness information in operation S210-2. An image signal processor 220 shown in FIG. 10 or 11 may extract brightness information about image data based on the image data output from the image sensor 100, and may set the ramping direction according to the extraction result. Information about the ramping direction may be programmed or set by the image signal processor 220 in the register REG of the image sensor 100.

As shown in FIG. 3, the timing generator 160 may generate the control signals VCASP and VSW and the switch signals VSW1 through VSWk for controlling the operation of the ramp signal generator 135 based on values stored in the register REG in operation S220.

When the switch signals VSW1 through VSWk are sequentially turned off (in case of YES) in operation S230, the ramp signal generator 135 may generate the ramp signal Vramp that ramps from a level corresponding to the minimum count value res_min or sig_min of the counter 150-1 according to the second case CASE2 in FIG. 3 in operation S240. However, when the switch signals VSW1 through VSWk are sequentially turned on (in case of NO) in operation S230, the ramp signal generator 135 may generate the ramp signal Vramp that ramps from a level corresponding to the maximum count value res_max or sig_max of the counter 150-1 according to the second case CASE1 in FIG. 3 in operation S250.

Figure 9:
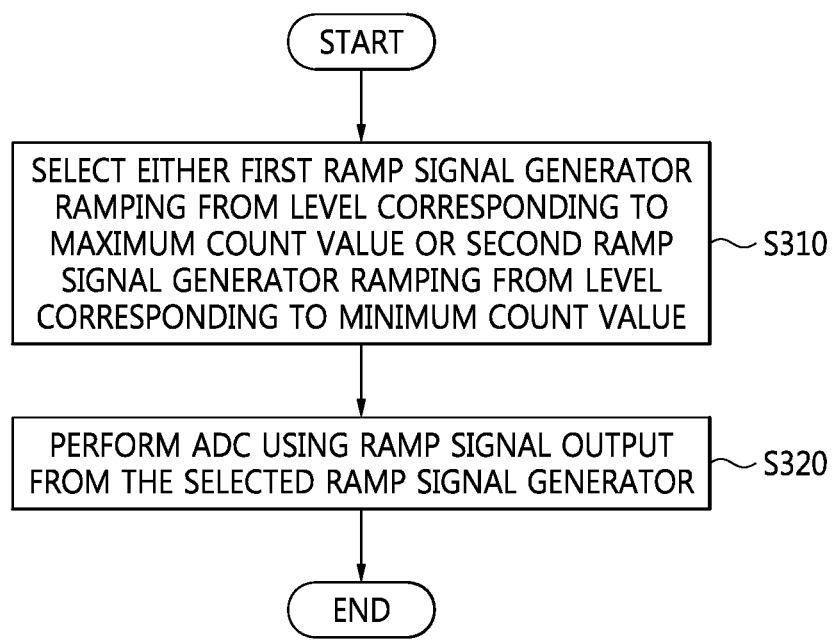
FIG. 9 is a flowchart of a method of operating the image sensor illustrated in FIG. 1, which includes the ramp signal generator illustrated in FIG. 4, according to an exemplary embodiment of the inventive concept.

FIG. 9 is a flowchart of a method of operating the image sensor 100 illustrated in FIG. 1, which includes the ramp signal generator 135B illustrated in FIG. 4, according to an exemplary embodiment of the inventive concept.

Referring to FIGS. 1, 4, 5A, 5B, and 9, the selection circuit 135-3 selects either the first ramp signal generator 135-1 which ramps from a level corresponding to the maximum count value res_max or sig_max of the counter 150-1 or the second ramp signal generator 135-2 which ramps from a level corresponding to the minimum count value res_min or sig_min of the counter 150-1 in operation S310. The selection circuit 135-3 outputs the ramp signal Uramp or Dramp output from the selected ramp signal generator 135-1 or 135-2 as the ramp signal Vramp. The AD converter circuit including the comparator circuit 140 and the counter circuit 150 may convert pixel signals output from the pixel array 110 into digital signals using the ramp signal Vramp output from the selection circuit 135-3 in operation S320.

Figure 10:
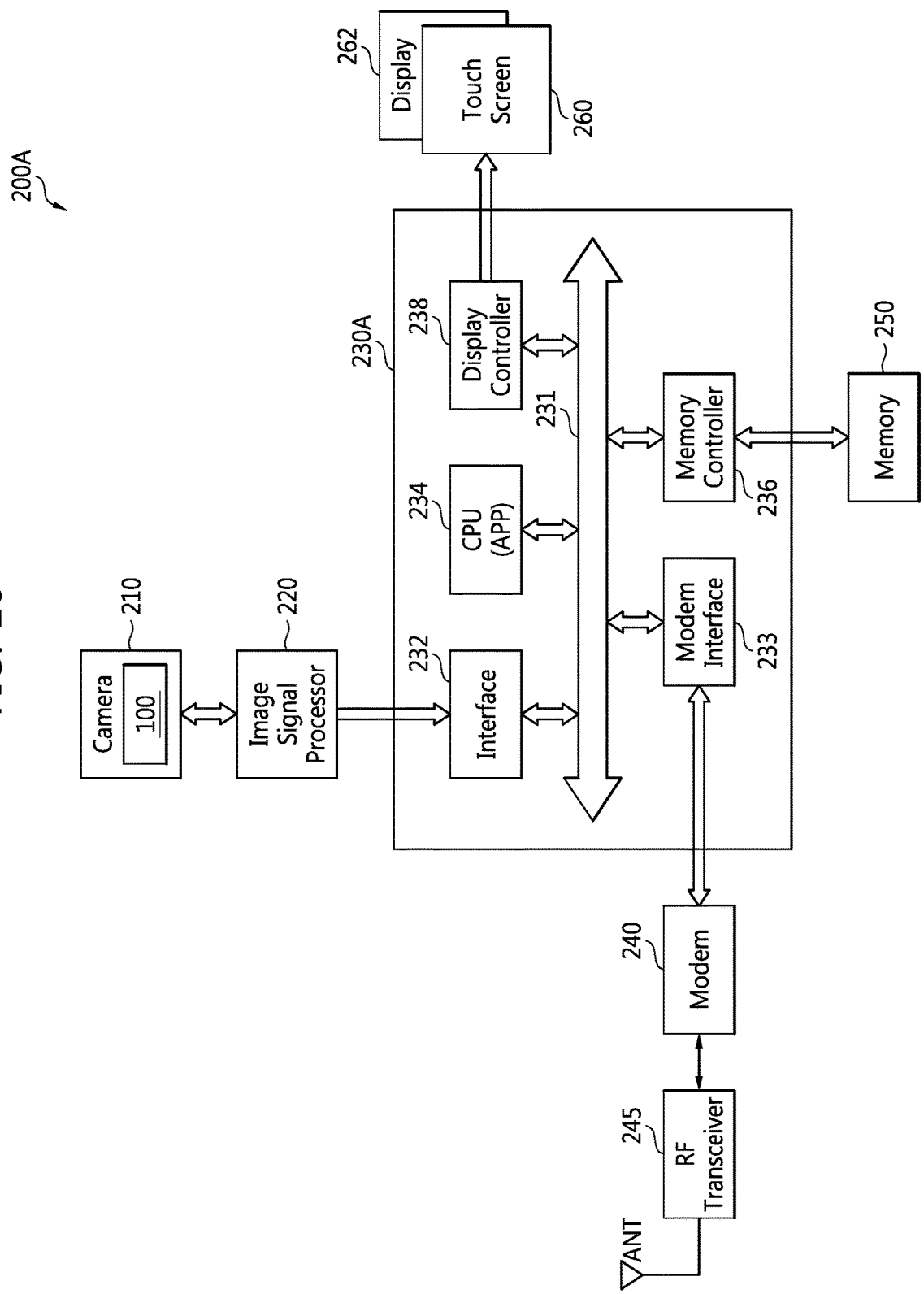
FIG. 10 is a block diagram of a computing device including the image sensor illustrated in FIG. 1 according to an exemplary embodiment of the inventive concept.

FIG. 10 is a block diagram of a computing device 200A including the image sensor 100 illustrated in FIG. 1 according to an exemplary embodiment of the inventive concept. Referring to FIGS. 1 through 10, the computing device 200A may be a mobile computing device. The mobile computing device may be implemented as a laptop computer, a cellular phone, a smart phone, tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The computing device 200A may include a camera 210 including the image sensor 100, the image signal processor (ISP) 220, a controller 230A, a modem 240, a radio frequency (RF) transceiver 245, a memory 250, and a display 262 including a touch screen 260. The image sensor 100 may be the one described with reference to FIGS. 1 through 9 above.

The camera 210 may generate image data using the image sensor 100. The ISP 220 may process the image data and output the processed image data to the controller 230A. The ISP 220 may convert image data from a first format into a second format. The first format may be a Bayer pattern and the second format may be a YUV format or RGB format, but the inventive concept is not restricted the current embodiments.

The ISP 220 may generate brightness information based on image data output from the image sensor 100, and may set the brightness information in the register REG of the image sensor 100. The RF transceiver 245 may transmit RF data received through an antenna ANT to the modem 240. The RF transceiver 245 may also convert data output from the modem 240 into RF data, and transmit the RF data to an external device through the antenna ANT. The modem 240 may process data transferred between the RF transceiver 245 and the controller 230A.

The controller 230A may control the camera 210, the ISP 220, the modem 240, the RF transceiver 245, the memory 250, the touch screen 260, and/or the display 262. The controller 230A may be implemented as an integrated circuit (IC), a system on chip (SoC), an application processor (AP), or a mobile AP. The controller 230A may include a bus architecture 231, an interface 232, a modem interface 233, a central processing unit (CPU) 234, a memory controller 236, and a display controller 238.

The CPU 234 may control the interface 232, the modem interface 233, the memory controller 236, and the display controller 238 via the bus architecture 231. The CPU 234 may execute the application program APP to select the determination from a low code or the determination from a high code.

A graphics user interface produced by the application program APP may be displayed on the display 262. A user may select the graphics user interface corresponding to the determination from a low code or the determination from a high code using the touch screen 260. Information selected by the user may be transmitted to the CPU 234 and the CPU 234 may set the selected information in the register REG of the image sensor 100.

The bus architecture 231 may be implemented as advanced microcontroller bus architecture (AMBA), an advanced high-performance bus (AHB), an advanced peripheral bus (APB), an advanced extensible interface (AXI), or an advanced system bus (ASB), but the inventive concept is not restricted to the current embodiments.

The interface 232 may transmit image data from the ISP 220 to the bus architecture 231. The image data may be transmitted to the memory controller 236 or the display controller 238. The modem interface 233 may control processing and/or transmission of data communicated with the modem 240 according to the control of the CPU 234. The memory controller 236 may control an access operation on the memory 250 according to the control of the CPU 234. The access operation may include a write operation for writing data to the memory 250 and a read operation for reading data from the memory 250.

The memory 250 may include volatile memory and/or non-volatile memory. Although one memory controller 236 and one memory 250 are illustrated in FIG. 10 for clarity of the description, the memory controller 236 may refer to a group of memory controllers that control different types of memory devices. The memory 250 may refer to a group of different types of memory devices.

The memory 250 may be formed with dynamic random access memory (DRAM). The memory 250 may be flash-based memory such as NAND-type flash memory, NOR-type flash memory, multimedia card (MMC), embedded MMC (eMMC), or universal flash storage (UFS), but the inventive concept is not restricted to these examples.

The display controller 238 may transmit data to be displayed on the display 262 to the display 262 according to the control of the CPU 234. The display controller 238 and the display 262 may communicate data with each other using mobile industry processor interface (MIPI) display serial interface or embedded DisplayPort (eDP).

The touch screen 260 may transmit a user input for controlling the operation of the computing device 200A to the controller 230A. The user input may be generated when a user touches the touch screen 260. The CPU 234 may control the operation of the image sensor 100, the camera 210, the controller 230A, the memory 250, and/or the display 262 according to the user input transmitted from the touch screen 260.

Figure 11:
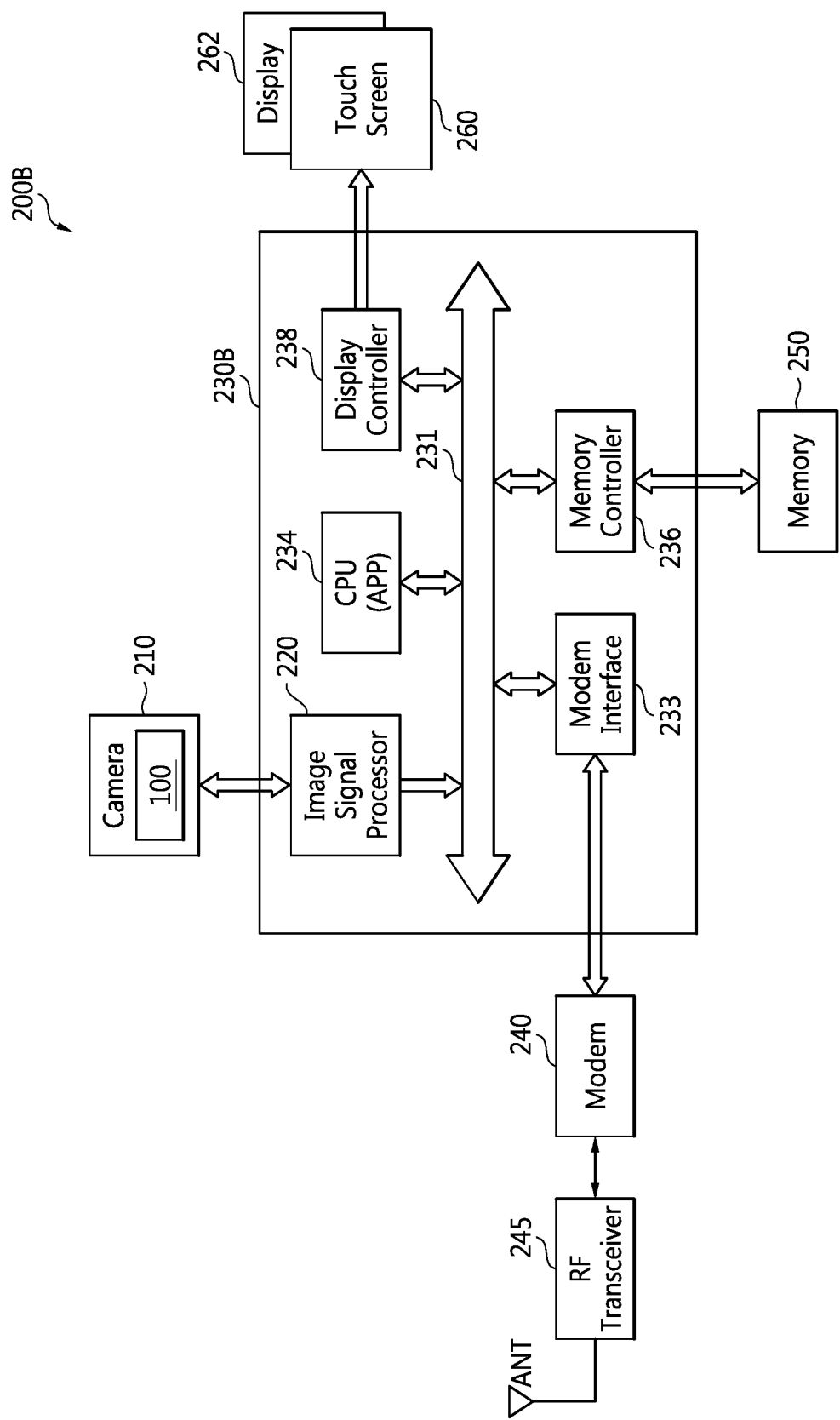
FIG. 11 is a block diagram of a computing device including the image sensor illustrated in FIG. 1 according to another exemplary embodiment of the inventive concept.

FIG. 11 is a block diagram of a computing device 200B including the image sensor 100 illustrated in FIG. 1 according to another exemplary embodiment of the inventive concept. Apart from the ISP 220 and the interface 232, the structure and operations of the computing device 200B including a controller 230B illustrated in FIG. 11 are substantially the same as or similar to those of the computing device 200A including the controller 230B illustrated in FIG. 10.

The ISP 220 may be included within the controller 230B in the embodiments illustrated in FIG. 11. The ISP 220 may receive and process image data from the image sensor 100, and may transmit the processed image data to the bus architecture 231. The image sensor 100 and the controller 230B may communicate data with each other using MIPI camera serial interface.

As described above, according to the exemplary embodiments of the inventive concept, an image sensor is able to determine ADC on a pixel signal output from a pixel from a high code, thereby improving nonlinearity in a low code region, operating in high speed, and increasing the quality of pictures. In addition, noise characteristics in the low code region are improved.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An image sensor comprising:
a pixel configured to generate a reset signal and an image signal;
a comparator configured to compare the reset signal with a reference signal and generate a first comparison signal;
a counter configured to generate a first count value corresponding to the reset signal based on a clock signal and the first comparison signal; and
a reference signal generator configured to generate the reference signal which changes between a first level corresponding to a maximum reset count value of the counter and a second level corresponding to a minimum reset count value of the counter during a reset signal period,
wherein the reference signal generator is configured to generate the reference signal from among a first reference signal ramping up from the first level to the second level and a second reference signal ramping down from the second level to the first level in response to control signals during the reset signal period.

2. The image sensor of claim 1, wherein the reference signal generator comprises:
a first reference signal generator configured to generate the first reference signal ramping up from the first level to the second level during the reset signal period;
a second reference signal generator configured to generate the second reference signal ramping down from the second level to the first level during the reset signal period; and
a selection circuit configured to output one among the first reference signal and the second reference signal as the reference signal in response to a selection signal.

3. The image sensor of claim 1, wherein the reference signal generator is further configured to control the reference signal to change between a third level corresponding to a maximum image signal count value of the counter and a fourth level corresponding to a minimum image signal count value of the counter during an image signal period.

4. The image sensor of claim 3, wherein the reference signal generator comprises:
a first reference signal generator configured to generate the first reference signal, as the reference signal, ramping up from the third level to the fourth level during the image signal period;
a second reference signal generator configured to generate the second reference signal, as the reference signal, ramping down from the fourth level to the third level during the image signal period; and
a selection circuit configured to output one of the first reference signal and the second reference signal as the reference signal in response to a selection signal.

5. The image sensor of claim 1, further comprising:
an output circuit configured to output a reset count value corresponding to a difference between the maximum reset count value and the first count value,
wherein one's complement of the first count value is generated after the reset signal period.

6. The image sensor of claim 5, wherein the output circuit further configured to output an image signal count value corresponding to a difference between a maximum image signal count value and a second count value, and a final count value corresponding to a difference between the image signal count value and the reset count value,
wherein one's complement of the first count value is generated between the reset signal period and an image signal period.

7. The image sensor of claim 1, wherein the reference signal generator controls the reference signal to decrease from the first level to the second level for the comparators to compare the reset signal with the reference signal during the reset signal period.

8. The image sensor of claim 7, wherein the reference signal generator controls the reference signal to decrease from a third level to a fourth level for the comparators to compare the image signal with the reference signal during an image signal period which is after the reset signal period.

9. The image sensor of claim 8, wherein the counter configured to generate a count value which is a combination of the first count value measured while the reference signal is changed with respect to the reset signal and a second count value measured while the reference signal is changed with respect to the image signal,
wherein one's complement of the first count value is generated between the reset signal period and the image signal period.

10. An image sensor comprising:
a plurality of pixels arranged in a plurality of columns and a plurality of rows;
a plurality of comparators each of which is configured to compare at least one reset signal and at least one image signal output from pixels in a same column or row with a reference signal;
a plurality of counters each of which is configured to generate a count value measured with respect to the reset signal and the image signal during one time period, comprising a reset signal period and an image signal period, in which a level of the reference signal is changed; and
a reference signal generator configured to generate the reference signal in response to a control signal during the one time period for converting pixel signals output from pixels in a same column or row from analog to digital,
wherein the reference signal generator includes a first signal generator configured to generate a first reference signal ramping up from a first level to a second level and a third level to a fourth level, and a second signal generator configured to generate a second reference signal ramping down from the second level to the first level and the third level to the fourth level,
wherein the count value is a combination of a first count value measured while the reference signal is changed with respect to the reset signal and a second count value measured while the reference signal is changed with respect to the image signal,
wherein the first level corresponds to a maximum reset count value of the counters, the second level corresponds to a minimum reset count value of the counters, the third level corresponds to a maximum image signal count value of the counters, and the fourth level corresponds to a minimum image signal count value of the counters.

11. The image sensor of claim 10, wherein one's complement of the first count value is generated between the reset signal period and the image signal period.

12. The image sensor of claim 10, wherein the reference signal generator controls the reference signal to decrease from the first level to the second level for the comparators to compare the reset signal with the reference signal during the reset signal period.

13. The image sensor of claim 12, wherein the reference signal generator controls the reference signal to decrease from a third level to a fourth level for the comparators to compare the image signal with the reference signal during the image signal period which is after the reset signal period.

* * * * *